(12) United States Patent
Walters et al.

(10) Patent No.: US 12,174,897 B2
(45) Date of Patent: *Dec. 24, 2024

(54) GENERATING SYNTHETIC DATA BASED ON TIME SERIES PREDICTIONS AND PLURAL MACHINE LEARNING MODELS

(71) Applicant: Capital One Services, LLC, McLean, VA (US)

(72) Inventors: Austin Walters, Savoy, IL (US); Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/541,730

(22) Filed: Dec. 15, 2023

(65) Prior Publication Data

US 2024/0111815 A1  Apr. 4, 2024

Related U.S. Application Data

(63) Continuation of application No. 17/931,166, filed on Sep. 12, 2022, now Pat. No. 11,886,516.

(51) Int. Cl.
*G06F 16/00* (2019.01)
*G06F 16/906* (2019.01)

(52) U.S. Cl.
CPC ................. *G06F 16/906* (2019.01)

(58) Field of Classification Search
USPC ........................................ 707/737
See application file for complete search history.

(56) References Cited

U.S. PATENT DOCUMENTS

2020/0401888 A1* 12/2020 Gugulothu ............ G06N 3/047
2021/0357431 A1* 11/2021 Yang ...................... G06Q 30/04

OTHER PUBLICATIONS

Chanakya Vivek Kapoor, Synthetic Data Generation Using Gaussian Mixture Model, Synthetic Data Generation, published Apr. 29, 2021, 42 pages. Retrieved from https://deepnote.com/@chanakya-vivek-kapoor/Synthetic-Data-Generation-QaaTRs73T2iCb0amHFbwpQ.

(Continued)

*Primary Examiner* — Chelcie L Daye
(74) *Attorney, Agent, or Firm* — Banner & Witcoff, Ltd.

(57) ABSTRACT

Aspects described herein may relate to methods, systems, and apparatuses for generating synthetic data based on time series predictions and plural machine learning models. Generating the synthetic data may include receiving one or more data records that include transaction data of a user, categorizing and/or segmenting the one or more data records, determining a first predicted time step based on the categorizing and/or segmenting, and performing an iterative process that determines further predicted time steps. The first predicted time step may be determined using one model of a plurality of machine learning models. The iterative process may determine the further predicted time steps using the plural machine learning models. Based on iterations of the iterative process, potential time series may be determined. The synthetic time series may be determined from the potential time series. The synthetic time series may be used by additional processes, such as additional machine-learning processes.

20 Claims, 7 Drawing Sheets

(56) References Cited

OTHER PUBLICATIONS

Solving Data Imbalance with Synthetic Data—Synthesized Blog_Reader View, published Apr. 30, 2021, 7 pages. Retrieved from https://www.synthesized.io/post/solving-data-imbalance-with-synthetic-data.

Generating_Expanding your datasets with synthetic data_Reader View, published Aug. 10, 2021, 5 pages. Retrieved from https://towardsdatascience.com/generating-expanding-your-datasets-with-synthetic-data-4e27716be218.

Puolamäki, Kai, et al., Interactive Visual Data Exploration with Subjective Feedback: An Information-Theoretic Approach, Data Mining and Knowledge Discovery (2020), vol. 34, pp. 21-49. 10.1007/s10618-019-00655-x.

Türkmen AC, Januschowski T, Wang Y, Cemgil AT (2021) Forecasting intermittent and sparse time series: A unified probabilistic framework via deep renewal processes. PLOS One 16(11): e0259764. Retrieved from https://doi.org/10.1371/journal.pone.0259764.

Samuel Assefa, et al., Generating synthetic data in finance: opportunities, challenges and pitfalls, 33rd Conference on Neural Information Processing Systems (NeurIPS 2019). Workshop on AI in Financial Services: Data, Fairness, Explainability, Trustworthiness, and Privacy. Vancouver, Canada. 10 pages. Retrieved from https://www.jpmorgan.com/content/dam/jpm/cib/complex/content/technology/ai-research-publications/pdf-8.pdf.

H. S. Hota, et al., Time Series Data Prediction Using Sliding Window Based RBF Neural Network, International Journal of Computational Intelligence Research, ISSN 0973-1873 vol. 13, No. 5 (2017), pp. 1145-1156. Retrieved from https://www.ripublication.com/ijcir17/ijcirv13n5_46.pdf.

Armando Vieira, Generating Synthetic Sequential Data using GANs—Towards AI, Nov. 9, 2020, 14 pages. Retrieved from https://pub.towardsai.net/generating-synthetic-sequential-data-using-gans-a1d67a7752ac.

Florian Follonier (formerly Müller), Stock Market Prediction using Multivariate Time Series and Recurrent Neural Networks in Python, relataly.com. Jun. 1, 2020. 8 pages. Retrieved from https://www.relataly.com/stock-market-prediction-using-multivariate-time-series-in-python/1815/.

Zachary Warnes, Generating Synthetic Time-Series Data with Random Walks, Towards Data Science, Dec. 14, 2021. 5 pages. Retrieved from https://towardsdatascience.com/generating-synthetic-time-series-data-with-random-walks-8701bb9a56a8.

Florian Follonier (formerly Müller), Rolling Time Series Forecasting: Creating a Multi-Step Prediction for a Rising Sine Curve using Neural Networks in Python, relataly.com. Apr. 19, 2020. 6 pages. Retrieved from https://www.relataly.com/multi-step-time-series-forecasting-a-step-by-step-guide/275/.

\* cited by examiner

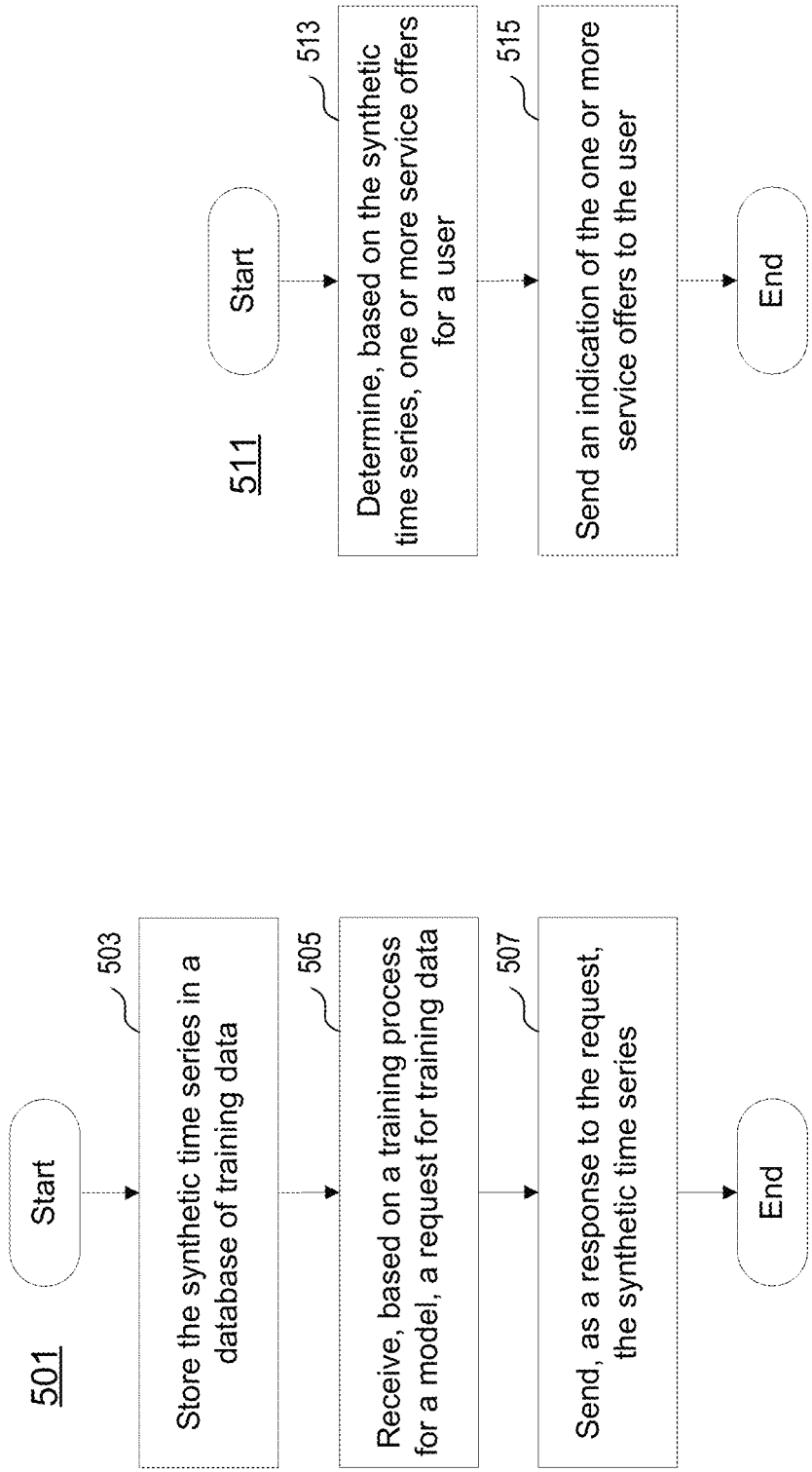

GENERATING SYNTHETIC DATA BASED ON TIME SERIES PREDICTIONS AND PLURAL MACHINE LEARNING MODELS

CROSS-REFERENCE TO RELATED APPLICATION(S)

This application is a continuation of U.S. patent application Ser. No. 17/931,166, filed on Sep. 12, 2022. The above-mentioned application is incorporated herein by reference in its entirety.

FIELD

Aspects described herein relate generally to time series predictions, machine learning models, and synthetic data generation, and the performance of machine-learning processes.

BACKGROUND

Implementing a machine learning model so that it is suitable for its intended purpose may be a time consuming and challenging process. Examples of the time consuming and challenging nature of implementing a machine learning model includes difficulties in training the machine learning model and difficulties in determining whether the machine learning model is accurate. The difficulties in training often involve the need for a sufficient volume of training data that is also of a sufficient quality. A sufficient volume of training data may be inaccessible or may not exist. Even if a sufficient volume of training data exists and is accessible, the training data may not be of sufficient quality. Further, testing to ensure that the training data is of sufficient quality may be time-intensive. Even past the difficulties in having training data that is both of a sufficient volume and of sufficient quality, the training process itself may be time intensive to perform. Even further, once the machine learning model is trained, determining whether the machine learning model's output is accurate may introduce its own challenges. For example, determining whether the machine learning model's output is accurate may require additional data that is different from the training data. Similar to training data, that additional data may need to exist, be accessible, be of sufficient volume, and be of sufficient quality. Ensuring that additional data is suitable for use may be time intensive and using that additional data to determine whether the machine learning model's output is accurate may also be time intensive. The above examples are only some of the difficulties that may illustrate the time consuming and challenging process of implementing a machine learning model.

SUMMARY

The following paragraphs present a simplified summary of various aspects described herein. This summary is not an extensive overview, and is not intended to identify key or critical elements or to delineate the scope of any claim. This summary merely presents some concepts in a simplified form as an introductory prelude to the more detailed description provided below.

Aspects described herein may address the above-mentioned challenges and difficulties, and generally improve the quality and/or the quantity of data that is available for various machine learning tasks. Further, aspects described herein may address one or more challenges and difficulties in generating time series prediction data and/or in generating synthetic data. Indeed, aspects described herein may address one or more challenges and difficulties in generating synthetic time series data that includes predicted time steps.

Aspects for generating synthetic time series data may relate to performing various processes that determine potential time series based on time series predictions and that determine the synthetic time series data based on the potential time series. For example, the various processes described herein may include receiving one or more data records that include transaction data of a user, categorizing the one or more data records, segmenting the one or more data records, and determining a first predicted time step based on the categorizing and segmenting. The first predicted time step may be determined by using one model of a plurality of machine-learning models. After determining the first predicted time step, an iterative process may be performed that determines further predicted time steps until a stop condition is satisfied that ends the iterative process. The further predicted time steps may be determined by using the plurality of machine-learning models. The potential time series may include the first predicted time step and the further predicted time steps. After the iterative process ends, a synthetic time series may be determined from the potential time series.

These features, along with many others, are discussed in greater detail below. Corresponding apparatus, systems, and computer-readable media are also within the scope of the disclosure.

BRIEF DESCRIPTION OF THE DRAWINGS

The present disclosure is illustrated by way of example and not limited in the accompanying figures in which like reference numerals indicate similar elements and in which:

FIGS. 5A-5D depict example methods for using synthetic time series data in accordance with various aspects described herein.

DETAILED DESCRIPTION

Figure 1:
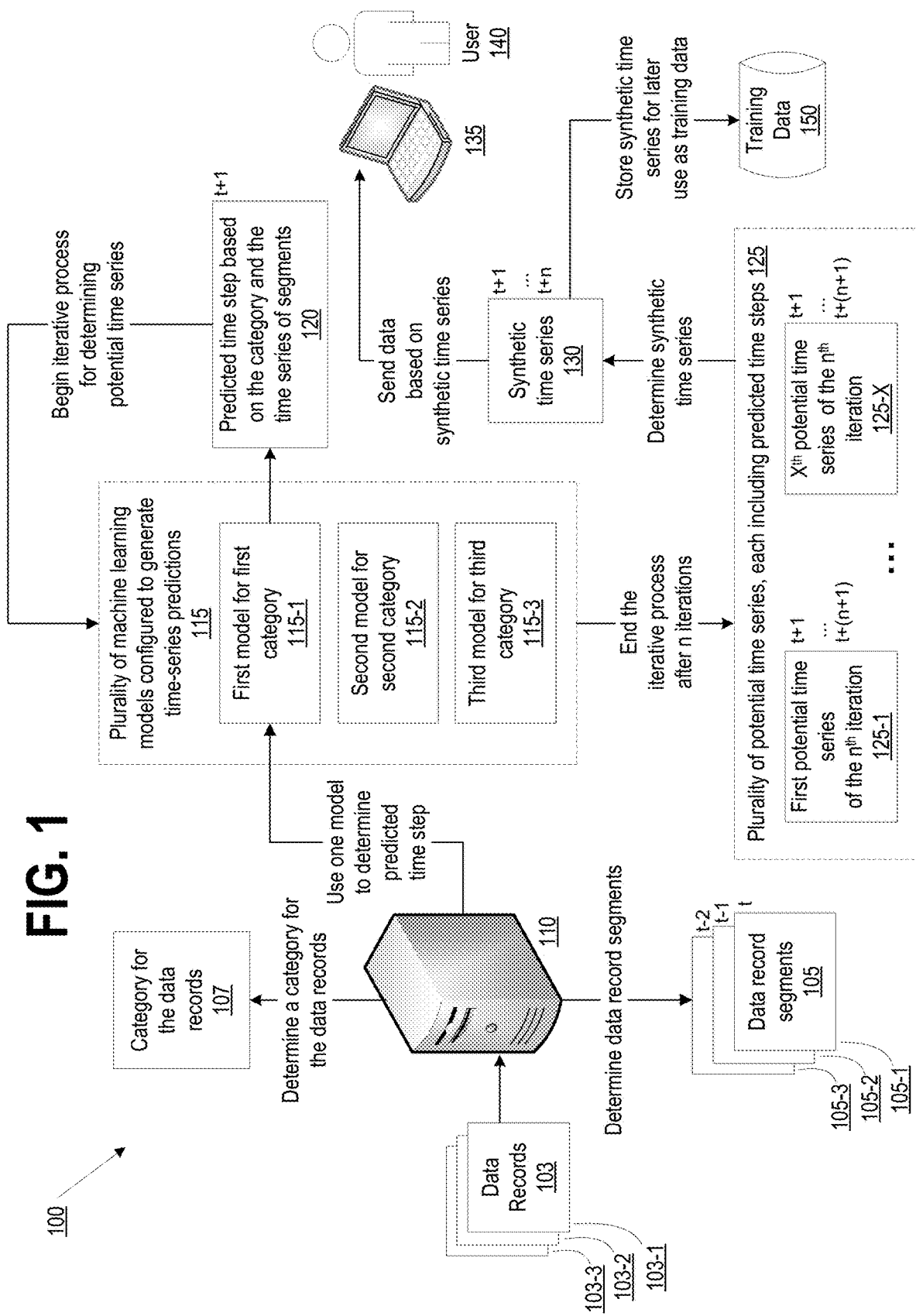
FIG. 1 depicts a block diagram of an example computing environment that, in accordance with various aspects described herein, determines synthetic time series data based on plural machine learning models.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Throughout this disclosure, the phrases "time series data" and "time series" are used and may refer to a collection of data points indexed according to a time interval. There are innumerable ways of organizing data into a time series. Even given a particular type of data that will form a time series, the particular type of data could be indexed according to many different time intervals, and each different interval would change the time series. Indeed, in some variations, a time interval may be equally spaced (e.g., a time interval of minutes, days, weeks, months, years, etc.), while in others the time interval may be unequally spaced (e.g., a time interval based on an occurrence of an event, such as a withdrawal, deposit, charge, payment, or other activity associated with a financial account). As one example, a time series may include a collection of withdrawals or deposits from a savings account indexed according to a monthly time interval. In this way, the time interval may include a per-month collection of amounts that were withdrawn or deposited to the savings account (e.g., amount X was withdrawn three months ago, amount Y was withdrawn two months ago, amount Z was withdrawn one month ago, etc.). For simplicity, the phrases "time series data" and "time series" may be used interchangeably.

Additionally, throughout this disclosure, the phrases "synthetic data" and "synthetic time series data" are used and may refer to data that is artificially generated rather than data that is generated or determined based on a real-world phenomenon or a real-world event. Data generated based on a real-world phenomenon or a real-world event is often obtained by direct measurement or direct observation of the real-world phenomenon or the real-world event. In this way, synthetic data may also be referred to as data that is not obtained by direct measurement or direct observation. As will become apparent in view of the many examples discussed throughout this disclosure, synthetic data may be generated to be different from data obtained by direct measurement or direct observation in one or more specific ways. For example, actual transaction data may be obtained by direct measurement or direct observation. Synthetic data may be generated to not include the actual transaction data and, instead, include predicted transaction data. While not including actual transaction data, the synthetic data may be indistinguishable from the actual transaction data and/or indistinguishable from other transaction data obtained by direct measurement or direct observation. For example, the actual transaction data may include transactions indicative of purchases using a holder's credit card account. Synthetic data may be generated to not include those transactions and, instead, include a series of predicted transactions indicative of predicted purchases using the holder's credit card account. Outside of the manner in which the predicted transaction was output, determined, and/or generated, a predicted transaction may be indistinguishable from a transaction that resulted from actual account holder activity.

By way of introduction, aspects discussed herein may relate to methods and techniques for determining synthetic time series data based on the plural machine learning models. The methods and techniques described herein, and/or various combinations of the features described herein, may improve processes for generating synthetic time series data, may improve processes for determining predictions of time steps for use in a time series, and/or may improve processes that use the synthetic time series data. The methods and techniques described herein include, among other things, the categorization and segmentation of a data record, the determination of a prediction associated with a category of a data record, an iterative process that uses plural machine learning models to determine potential time series predictions, and the determination of a synthetic time series from the potential time series predictions. The details of these methods and techniques, among other aspects, will be described in more detail herein. For simplicity, a machine learning model may be referred interchangeably herein as a model.

FIG. 1 depicts a block diagram of an example computing environment 100 that determines synthetic time series data based on plural machine learning models. As a brief overview, the example computing environment 100 includes a server 110 that may receive one or more data records 103 and may perform various processes with other components of the example computing environment 100. As depicted, the other components include a plurality of machine learning models 115, a user computing device 135, and a database of training data 150.

The server 110 may be configured to implement the plurality of machine learning models 115. Alternatively, the plurality of machine learning models 115 may be implemented in one or more computing devices different from the server 110. Further, while the server 110 is depicted in FIG. 1 as being a single computing device for simplicity, the processes performed by the server 110 may be performed by one or more computing devices.

Each of the plurality of machine learning models 115 may be any suitable type of machine learning model that is configured to output at least one predicted time step for a segment of input data. For example, each of the plurality of machine learning models may be a recurrent neural network architecture or some other type of deep learning architecture. Examples of a suitable recurrent neural network architecture include a long short-term memory (LSTM) and a Gated Recurrent Unit (GRU). As will be discussed throughout this disclosure, a segment of input data may include a portion of the one or more data records 103 and/or one or more predicted time steps that were previously output by one of the plurality of machine learning models 115. Additionally, each of the plurality of machine learning models 115 may output a confidence value for a predicted time step.

Each of the plurality of machine learning models 115 may have been configured to output the at least one predicted time step based on a training process. The training process may train a model using training data indicative of a category. As depicted in FIG. 1, the plurality of models 115 includes a first model 115-1 for a first category, a second model 115-2 for a second category, and a third model 115-3 for a third category. The first model 115-1 may have been trained using first training data indicative of the first category. The second model 115-3 may have been trained using second training data indicative of the second category. The third model 115-3 may have been trained using third training data indicative of the third category. In this way, the first model 115-1 may be configured to output a predicted time step based on the first category. The second model 115-2 may be configured to output a predicted time step based on the second category. The third model 115-3 may be configured to output a predicted time step based on the third category.

The three categories depicted in FIG. 1 may have been provided based on a categorization scheme that will be applied to the one or more data records 103. In some variations, the categorization scheme may be based on the types of transactions included in the one or more data records 103. As one example, if the one or more data records 103 include account statements, the categorization scheme may be to categorize based on spending. In this way, each of the three categories may be indicative of a particular level of spending. Continuing the example, the first category may indicate low spending that is below a first spending threshold. The second category may indicate medium spending that is above the first spending threshold and below a second spending threshold. The third category may indicate high spending that is below the second spending threshold. Other categorization schemes could be used if the one or more data records 103 include account statements, such as categorizing based on income. In this way, each of the three categories may be indicative of a particular level of income. Given the many different types of transactions that could be included in a data record, there are many different categorization schemes that could be implemented. Thus, there are many different categories that could form a basis for training or otherwise configuring the plurality of machine learning models 115.

The three models depicted in FIG. 1 are only an example of the number of models that may be included by the plurality of machine learning models 115. There could be fewer or more than three models in the plurality of machine learning models 115. The number of models in the plurality of machine learning models 115 may be based on the categorization scheme. In this way, for example, if the categorization scheme provides a plurality of categories, the plurality of machine learning models 115 may include a model for each of the plurality of categories. (e.g., three models if the categorization scheme provides three categories; five models if the categorization scheme provides five categories). Additional examples, and details, to the plurality of machine learning models 115, the categories, and the categorization schemes will be discussed below.

The user computing device 135 may be a computing device that is able to display information to and receive input from a user 140. For example, the user computing device 135 may be a laptop computer, a personal computer, or a tablet computer. The user computing device 135 may be able to communicate with the server 110 via a network (e.g., a local area network or a wide area network).

The database of training data 150 may be a storage medium, or storage device, that stores data suitable for training a machine learning model that is different from the plurality of machine learning models 115 and/or is otherwise not shown in FIG. 1. In this way, for example, the database of training data 150 may include training data for training a transformer, a convolutional network architecture, a recurrent neural network architecture, a deep neural network, a variational autoencoder (VAE), a combination of the aforementioned model types, or a different type of model.

The server 110 and the other components of the example computing environment 100 are depicted in FIG. 1 as performing various processes in connection determining synthetic time series data. The server 110 may perform processes for receiving, categorizing, and/or segmenting one or more data records 103. The server 110 may perform processes for configuring and/or using the plurality of machine learning models 115. For example, as depicted in FIG. 1, the server 110 may perform a process that uses a first model 115-1 to output a predicted time step based on the data records 103. As also depicted in FIG. 1, the server 110 may perform an iterative process for determining potential time series and each successive iteration may determine a further predicted time step. After the iterative process ends, the server 110 may perform a process for determining a synthetic time series based on the potential time series. The server 110 may perform further processes using the synthetic time series. For example and as depicted in FIG. 1, the server 110 may, based on the synthetic time series, send data to a computing device 135 of the user 140. The server 110 may store, in a database 150 of training data, the synthetic time series for later use as training data. The server 110 and the other components of the example computing environment 100 may perform other processes not explicitly shown by FIG. 1. For example, the server 110 may perform a process for training the plurality of machine learning models. As another example, the server 110 may perform a process for modifying the synthetic time series based on one or more additional data records. Examples and further details of these processes will be discussed below.

To begin the discussion of the example computing environment 100 of FIG. 1, the server 110 may receive one or more data records 103. The one or more data records 103 may include transaction data associated with at least one user (e.g., user 140). In some variations, the transaction data may be for at least one account of the at least one user. As some examples, the one or more data records 103 may include transaction data for a savings account of the user 140 (e.g., indications of withdrawals and/or deposits into the savings account), for a checking account of the user 140 (e.g., indications of withdrawals and/or deposits into the checking account), and/or for a credit card account of the user 140 (e.g., indications of charges and/or payments to the credit card account). More generally, the one or more data records 103 may include various types of data including numeric data, textual data, and the like. The one or more data records 103 may be a particular type of record such as customer record data, account statements, account information, or some other type of data that would include transaction data. Further, the data records 103 may be organized into one or more sets. For example, as depicted in the example computing environment 100, the one or more data records 103 includes a first set 103-1 of data records, a second set 103-2 of data records, and a third set 103-3 of data records. Each set 103-1, 103-2, and 103-3 may include its own, different portion of transaction data. For example, if the data records 103 includes 3 months of account statements, the first set 103-1 may include the account statement for the first month, the second set 103-2 may include the account statement for the second month, and the third set 103-3 may include the account statement for the third month.

After receiving the one or more data records, the one or more data records 103 may be categorized and/or segmented. As depicted in FIG. 1 and to categorize the one or more data records 103, the server 110 may determine a category 107 for the one or more data records 103. Determining the category 107 may be based on one or more classification techniques (e.g., classification techniques including a logical regression classifier, a naïve Bayes classifier, a k-nearest neighbor classifier, a decision tree classifier, a support vector machine, and the like).

The category 107 may be provided by, or otherwise associated with, a categorization scheme. As mentioned above, there are many different types of transactions that could be included in a data record and there are many different categorization schemes that could be implemented for categorizing the one or more data records 103. Thus, for simplicity, the remaining discussion of FIG. 1 will be in view of an example where particular data records are received and where a particular categorization scheme is used. Where appropriate, this example will be referred to as the example of FIG. 1. The example of FIG. 1 will be in terms of the one or more data records 103 including one or more account statements for an account of the user 140 (e.g., a savings account of the user 140, a checking account of the user 140, or a credit card account of the user 140). The one or more account statements may indicate various financial transactions with the account of the user 140, such as withdrawals, deposits, charges, payments, and the like. Based on the one or more data records 103 including the one or more account statements, the example of FIG. 1 will be in terms of a categorization scheme that categorizes the one or more data records 103 based on spending of the user 140. More particularly, the example of FIG. 1 will be in terms of a categorization scheme that provides three categories: a first category that indicates low spending, which is below a first spending threshold; a second category that indicates medium spending, which is above the first spending threshold and below a second spending threshold; and a third category that indicates high spending, which is below the second spending threshold. Variations, alternatives, and additions to the example of FIG. 1 will be apparent based on the aspects described herein. As one example variation, the categorization scheme could categorize the one or more data records 103 based on income of the user 140 (e.g., a first category that indicates low income, which is below a first income threshold; a second category that indicates medium income, which is above the first income threshold and below a second income threshold; and a third category that indicates high income, which is below the second income threshold).

As depicted in FIG. 1, the example computing environment 100 indicates the categorization scheme for the example of FIG. 1. Indeed, this categorization scheme is indicated by the plurality of machine learning models 115 including three models, with each of the three models being for its own category. As depicted in FIG. 1, the plurality of machine learning models 115 includes a first model 115-1 for a first category, a second model 115 for a second category, and a third model 115-3 for a third category. For the example of FIG. 1, the first model 115-1 may be for a first category that indicates low income, the second model 115-2 may be for a second category that indicates medium income, and the third model 115-3 may be for a third category that indicates high income. In this way, the first model 115-1 may be configured to output a predicted time step based on the low income. The second model 115-2 may be configured to output a predicted time step based on the medium income. The third model 115-3 may be configured to output a predicted time step based on the high income. Continuing the example of FIG. 1, the first model 115-1 may have been trained using training data indicative of low spending (e.g., a first corpus of account statements for accounts of first users that exhibit low spending), the second model 115-2 may have been trained using second training data indicative of medium spending (e.g., a second corpus of account statements of accounts for second users that exhibit medium spending), and the third model 115-3 may have been trained using third training data indicative of high spending (e.g., a third corpus of account statements for accounts of third users that exhibit high spending).

As also depicted in FIG. 1 and to segment the one or more data records 103, the server 110 may determine data record segments 105 based on the one or more data records 103.

The determination of the data record segments 105 may be based on a segmentation technique that organizes, transforms, or otherwise collects the transaction data of the one or more data records 103 into segments. The segments may be organized as a time series and/or based on a particular time interval. The time interval may be based on a day, month, year, or some other discrete interval of time. A segmentation technique may include summing transactions together based on the time interval. For the example of FIG. 1, the server 110 may sum transactions together that occur on the same day, occur within the same month, or occur on the same year. A segmentation technique may include ignoring, filtering, or otherwise removing transactions that, based on the categorization scheme, are not relevant to the time series. For the example of FIG. 1, the server 110 may remove a transaction indicating a transfer to another account of the user 140 (e.g., a transfer from a checking account of the user 140 to a savings account of the user 14) based on such a transaction not being indicative of spending. A segmentation technique may include ordering transactions based on time and/or a time interval (e.g., the server 110 may order transactions from most recent to oldest; the server 110 may order transactions from oldest to most recent; the server may order transactions by grouping transactions that occurred on the same day together; the server 110 may order transactions by grouping transactions that occurred in the same month together). A segmentation technique may include additional processes for organizing, transforming, or otherwise collecting data as a time-series, including a process that uses a hidden Markov model.

Based on the determination, the data record segments 105 may include a time series of time steps. Each time step may include, based on the time interval of the time series, its own portion of time series data. For example and as depicted in FIG. 1, the data record segments 105 includes three time steps 105-1, 105-2, and 105-3. The three time steps 105-1, 105-2, and 105-3 may be based on a time interval of a day, a month, a year, etc. The time interval and its relationship to the time steps are represented by the notation t, t−1, and t−2. Based on the notation, the first time step 105-1 includes first time series data for the most recent time interval, t. The second time step 105-2 includes second time series data for the second most recent time interval, t−1. The third time step 105-3 includes third time series data for the third most recent time interval, t−2. With respect to the example of FIG. 1 and a time interval of a month, the first time step 105-1 may include transaction data of the most recent month, the second time step 105-2 may include second transaction data of the previous month, and the third time step 105-3 may include third transaction data of two months ago. The three time steps 105-1, 105-2, and 105-3 depicted in FIG. 1 are only an example of the number of time steps that may be included by the data record segments 105. There could be fewer or more than three time steps in the data record segments 105.

For simplicity, FIG. 1 depicts the categorization and segmentation as being based on the one or more data records 103. In this way, the categorization and segmentation could be performed in parallel with each other or sequentially without any dependence between the two processes. In some variations, however, categorizing and segmenting based on the one or more data records 103 may be performed in a dependent fashion. For example, the categorization may be performed after the segmentation and/or based on the results of the segmentation (e.g., in such variations, the server may determine the category 107 based on the data record segments 105). As another example, the segmentation may be performed after the categorization and/or based on the categorization (e.g., in such variations, the server 110 may determine the data record segments 105 based on the category 107).

After categorizing and/or segmenting the one or more data records 103, the server 110 may use one of the plurality of machine learning models 115 to determine a predicted time step 120. The predicted time step 120 may be based on the category 107 and the data record segments 105. For example and to determine the predicted time step 120 based on the category 107, the server 110 may use the model that matches, or is otherwise configured for, the category 107. As depicted in FIG. 1, the server 110 uses the first model 115-1. The first model 115-1 may be used based on the category 107 matching the first category and the first model 115-1 being for the first category. To determine the predicted time step 120 based on the data record segments 105, the server may use, as input to the first model 115-1, one or more time steps of the data record segments 105. The number of time steps used as input may depend on the configuration of the plurality of machine learning models 115 and/or the time interval used to form the time series of the data record segments 105. For example, in some variations, each of the plurality of machine learning models 115 may be configured to receive a single time step (e.g., receive the most recent time step, t). In such variations, the server 110 may use a single time step of the data record segments 105 as input to the first model 115-1 (e.g., the time step t of the data record segments 105). In other variations, each of the machine learning models 115 may be configured to receive, as input, plural time steps (e.g., receive the two most recent time steps, t and t−1). In such variations, the server 110 may use plural time steps of the data record segments 105 as input to the first model 115-1 (e.g., the time steps t and t−1 of the data record segments 105).

As depicted in FIG. 1, the predicted time step 120 is shown with notation t+1. Based on this notation, the predicted time step 120 may be a prediction of the next time step in the time series of the data record segments 105. In this way, the predicted time step 120 may include predicted transaction data for the next time step in the time series of the data records segments 105. For example, if the time interval is a month, the predicted time step 120 may include predicted transaction data that indicates transactions that are predicted to occur in the next month in the time series of the data record segments 105. Further, based on the inclusion of the notation, t+1, in the plurality of potential time series 125, the predicted time step 120 may be included in each potential time series 125. Details of the plurality of potential time series 125 will be discussed below.

After using one of the models to determine the predicted time step 120, the server 110 may begin an iterative process for determining potential time series. The iterative process may include using the predicted time step 120 as input into each of the plurality of machine learning models 115, using the plurality of machine learning models 115 to determine further predicted time steps, determining whether to end the iterative process, using the further predicted time steps as input into each of the plurality of machine learning models 115 to determine yet further predicted time steps if the iterative process continues, and proceeding to determine a synthetic time series if the iterative process ends. In general, each predicted time step may be included in a potential time series. Moreover, the iterative process may continue to determine further and further predicted time steps until a stop condition for the iterative process is satisfied. The stop condition may be based on performing a set number of iterations, based on one or more thresholds of confidence values for the predicted time steps, or the like. Examples and details of stop conditions will be discussed below.

FIG. 1 depicts the iterative process that ends after n iterations and has determined a plurality of potential time series 125. FIG. 1 depicts the plurality of potential time series 125 as including a number, X, of potential time series. This number, X, is based on the number of iterations performed by the iterative process and the number of models in the plurality of machine learning models 115. As some examples, if the plurality of machine learning models 115 includes three models, the plurality of potential time series 125 may include 3 potential time series if the iterative process ended after a single iteration, 9 potential time series if the iterative process ended after two iterations, and 27 potential time series if the iterative process ended after three iterations. Additionally and as depicted in FIG. 1, each of the plurality of potential time series 125 includes a number of predicted time steps that is one greater than the number of iterations performed by the iterative process. This relationship between the number of predicted time steps and the number of iterations performed during the iterative process is represented by the notation "t+1 . . . t+(n+1)". Further, the notation indicates that each of the plurality of potential time series 125 includes the predicted time step 125 (e.g., based on the notation having "t+1") and at least one predicted time step determined by the iterative process (e.g., based on the notation having "t+(n+1)"). Each of the plurality of potential time series 125 may differ from each other potential time series by including at least one predicted time step that is not included in any other potential time series.

Figure 2:
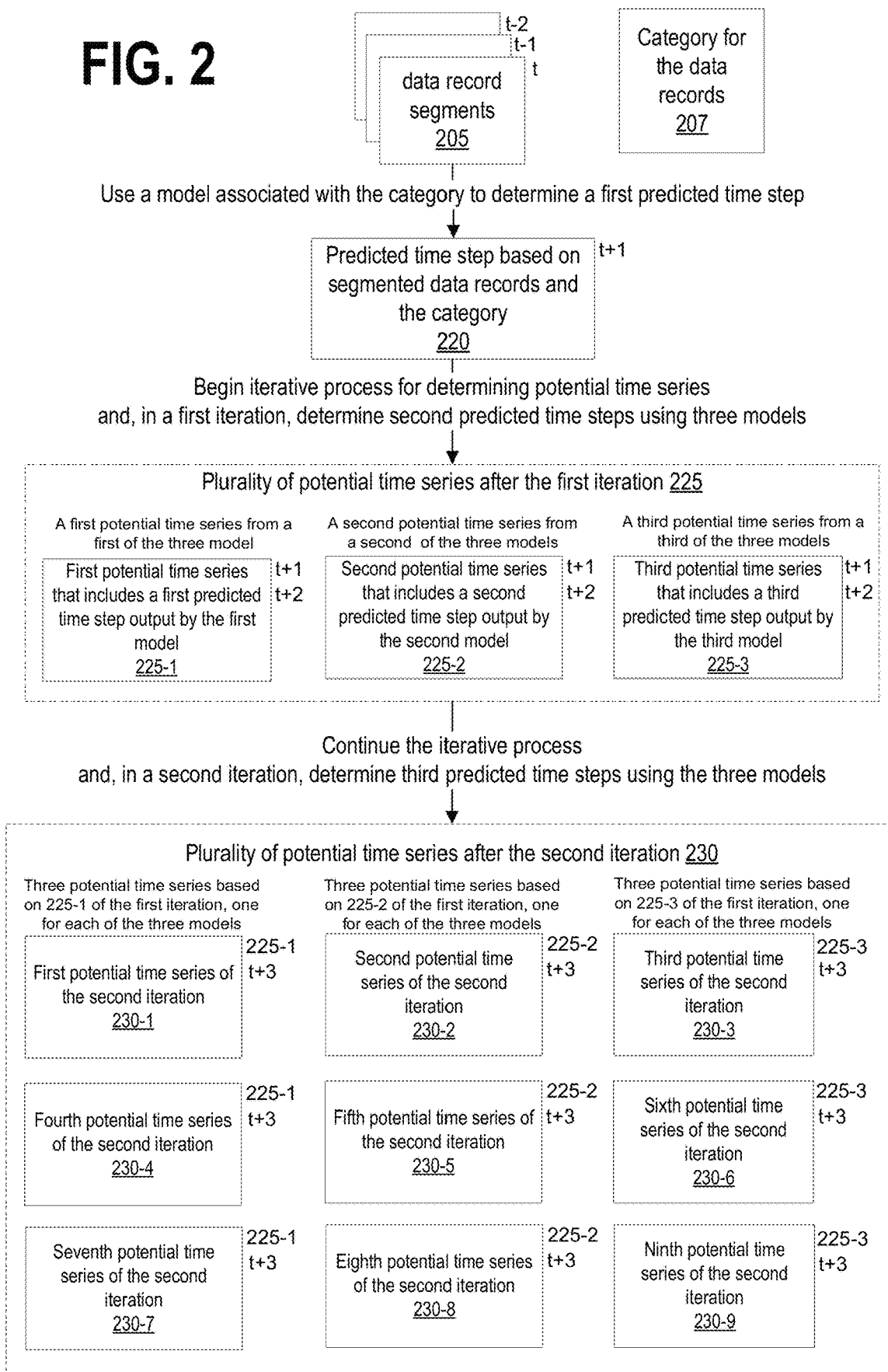
FIG. 2 depicts examples of data that may be used, determined, and/or otherwise generated in connection with processes for determining synthetic time series data in connection with various aspects described herein.

To further illustrate the iterative process, an example of the iterative process will be discussed in view of FIG. 2. In particular, FIG. 2 depicts examples of data that may be used, determined, and/or generated by the server 110 in connection with determining the predicted time step 120 and the iterative process for determining potential time series. The examples of FIG. 2 begin with one or more data records having been categorized and segmented. In this way, FIG. 2 depicts data record segments 205 having a time series of time steps t, t−1, and t−2, and depicts a category 207 for the one or more data records. The data record segments 205 may be the same as the data record segments 105 depicted in FIG. 1. The category 207 may be the same as the category 107 depicted in FIG. 1.

The examples of FIG. 2 continue with a predicted time step 220 being determined based on use of a model associated with the category 207. The predicted time step 220 may be the same as the predicted time step 120 depicted in FIG. 1. The model used to determine the predicted time step 220 may be same as, or similar to, the depiction in FIG. 1. For example, one or more time steps (e.g., t, t−1, t−2) of the data record segments 205 may be used, as input, to a model that matches, or is otherwise configured for, the category 207. As denoted by the notation t+1, the predicted time step 220 may be a prediction of the next time step in the time series of the data record segments 205. As illustrated by the examples of FIG. 2, the predicted time step 120 may be included in each of the potential time series. In this way, determining the predicted time step 220 based on use of a single model may result in each potential time series being based on the category 207 for the one or more data records.

The examples of FIG. 2 continue with the beginning of the iterative process for determining potential time series. As a comparison to the determination of the predicted time step 220, the iterative process may repeatedly use each of a plurality of machine learning models, while the determination of the predicted time step 220 may use only a single of the plurality of machine learning models (e.g., the single model that matches, or is otherwise configured for, the category 207). In this way, having the iterative process use each of the plurality of machine learning models may result in the plurality of potential time series being based on the plurality of categories provided by the categorization scheme. The examples of FIG. 2 are depicted as using a plurality of machine learning models that includes three models. The three models may be the same, or similar to, those of the plurality of machine learning models 115 depicted by FIG. 1. In other words, the three models may include a first model for a first category, a second model for a second category, and a third model for a third category.

At a first iteration of the iterative process, second predicted time steps may be determined using the three models. The examples of FIG. 2 depict a plurality potential time series 225 that results after the first iteration. As depicted in FIG. 2, the plurality of potential time series 225 includes a first potential time series 225-1, a second potential time series 225-2, and a third potential time series 225-3. The first potential time series 225-1 may include the predicted time step 220 and a first predicted time step output by the first model during the first iteration. The second potential time series 225-2 may include the predicted time step 220 and a second predicted time step output by the second model during the first iteration. The third potential time series 225-3 may include the predicted time step 220 and a third predicted time step output by the third model during the first iteration.

The notation used in connection with the plurality of potential time series 225 denotes what predicted time steps may be included in each of the plurality of potential time series 225. As denoted by the notation t+1 and t+2, each of the plurality of potential time series 225 may include predictions of the next two time steps in the time series of the data record segments 205.

If the iterative process was to stop after the first iteration, there would be three potential time series usable for determining a synthetic time series. However, if the iterative process was to continue, there would be more potential time series usable for determining a synthetic time series.

The examples of FIG. 2 continue with the continuation of the iterative process for determining potential time series. At a second iteration of the iterative process, third predicted time steps may be determined using the three models. For example, one or more predicted time steps from each of the potential time series 225 may be provided, as input, to each of the three models. In this way and as depicted in FIG. 2, the second iteration may determine a plurality of potential time series 230 that includes nine potential time series 230-1 through 230-9. The plurality of potential time series 230 includes, based on the first potential time series 225-1, three potential time series 230-1, 230-4, 230-7. Potential time series 230-1 may be based on the first potential time series 225-1 and the first model. The potential time series 230-4 may be based on the first potential time series 225-1 and the second model. The potential time series 230-7 may be based on the first potential time series 225-1 and the third model. The plurality of potential time series 230 includes, based on the second potential time series 225-2, three more potential time series 230-2, 230-5, 230-8, one for each of the three models. The plurality of potential time series 230 includes, based on the third potential time series 225-3, three further potential time series 230-3, 230-6, 230-9.

The notation used in connection with the plurality of potential time series 230 denotes what predicted time steps may be included in each of the plurality of potential time series 230. As denoted by the notations, each of the plurality of potential time series 230 may include predictions of the next three time steps in the time series of the data record segments 205. As one example, as denoted by the notation 225-2 and t+3 for the eighth potential time series 230-8, the first potential time series 230-1 may include, based on the first iteration, all the predictions of the second potential time series 225-2, and may include, based on the second iteration, the third predicted time step, t+3.

If the iterative process was to stop after the second iteration, there would be nine potential time series usable for determining a synthetic time series. However, if the iterative process was to continue, there would be more potential time series usable for determining a synthetic time series.

A comparison between the first iteration and the second iteration illustrates the multiplicative nature of the example iterative process depicted in FIG. 2. Indeed, the first iteration used the predicted time step 220 as input to the three models. This determined 3 potential time series (e.g., a single input multiplied by three models). The second iteration used the plurality of potential time series 225 as a basis for input to the three models. This determined 9 potential time series (e.g., three different inputs multiplied by three models). This multiplicative nature would be further illustrated if the example is continued for further iterations. For example, if the example iterative process depicted in FIG. 2 continued for a third iteration, the third iteration may use the plurality of potential time series 230 as a basis for inputs to the three models. As there are nine different potential time series in that plurality 230 and there are three models, the third iteration may determine 27 potential time series (e.g., nine different inputs multiplied by three models). Changes to the number of models used by the iterative process may change the number of potential time series that are determined, but may maintain the multiplicative nature of the iterative process. In some variations with five models, the first iteration may determine 5 potential time series (e.g., 1 multiplied by 5), the second iteration may determine 25 potential time series (e.g., 5 multiplied by 5), the third iteration may determine 125 potential time series (e.g., 25 multiplied by 5), and the like.

Having discussed the iterative process in view of the examples depicted in FIG. 2, the discussion of the example computing environment 100 of FIG. 1 can continue. After ending the iterative process, the server 110 may determine a synthetic time series 130 from the plurality of potential time series 125. In some variations, this determination may be based on confidence values associated with the plurality of potential time series 125. For example, each of the plurality of machine learning models 115 may be configured to output a confidence value for each predicted time step. In this way, each of the plurality of potential time series 125 may be associated with confidence values for its predicted time steps. The server 110 may determine, for each of the plurality of potential time series 125, an overall confidence value based on the confidence values for its predicted time steps (e.g., by multiplying each of the confidence values for its predicted time steps together); compare the overall confidence values of the plurality of potential time series 125 to each other; determine, based on the comparison, which potential time series 125 indicates the greatest confidence; and select the potential time series with the greatest confidence as the synthetic time series 130. In additional or alternative variations, determining the synthetic time series 130 may be based on selecting one of the plurality of potential time series 125 in a randomized fashion; selecting multiple, or all, of the plurality of potential time series 125 as the synthetic time series 130; and/or a combination of any of the above-discussed ways in which the synthetic time series 130 can be determined from the plurality of potential time series 125. Additional details, variations, and examples of how the server 110 may determine the synthetic time series 130 from the plurality of potential time series 125 will be discussed in view of FIG. 4.

After determining the synthetic time series 130 from the plurality of potential time series 125, the server 110 may use the synthetic time series 130 for one or more additional processes or otherwise make the synthetic time series 130 available for one or more additional processes. The one or more additional processes may include machine learning tasks and other non-machine learning task. The example computing environment 100 of FIG. 1 depicts an example of both a machine learning task and a non-machine learning task. For the example machine learning task and as depicted in FIG. 1, the server 110 may store, in a database 150 of training data, the synthetic time series 130 for later use as training data. In this way, the synthetic time series 130 may be used to train another machine learning model (not shown in FIG. 1). For the example non-machine learning task and as depicted in FIG. 1, the server 110 may determine data based on the synthetic time series and send the data to the user computing device 135 associated with the user 140. The data may include one or more service offers, such as an offer for a bank account, credit card, discount, or other type of service, that the user 140 may want to take advantage of. The data may be sent in the form of an email, text message, chat message, web page, or the like. Send such data may allow for service offers to be sent based on predicted behavior of the user 140. The predicted behavior of the user 140 may be indicated by the synthetic time series 130. Indeed, in some variations, the synthetic time series 130 indicates predicted behavior of the user 140 in view of the synthetic time series 130 including predicted time steps that were determined based on actual transactions associated with the user 140 (e.g., actual transactions included on account statements of the user 140).

Figure 3:
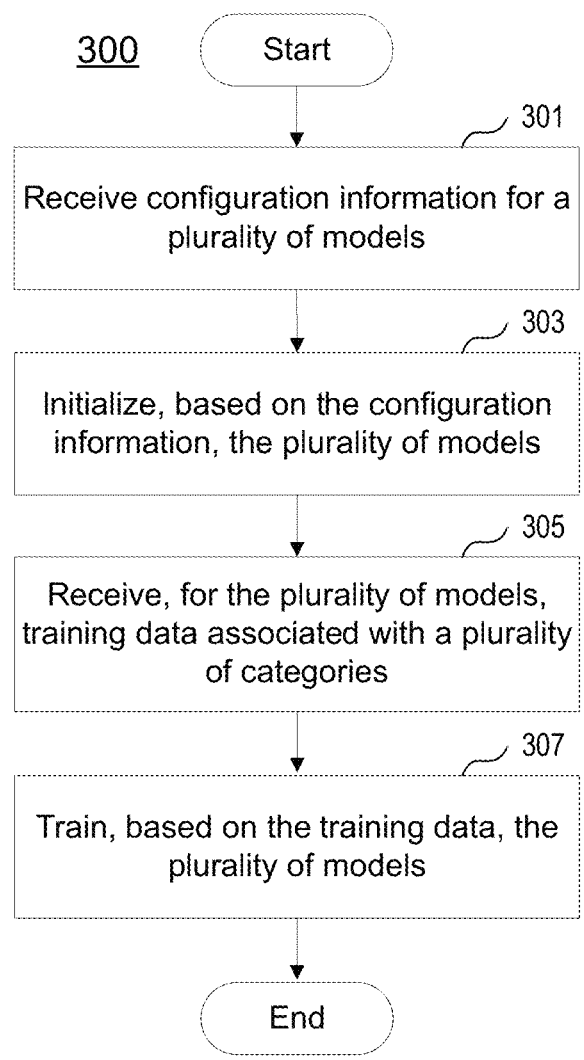
FIG. 3 an example method for configuring plural machine learning models in accordance with various aspects described herein.
Figure 4:
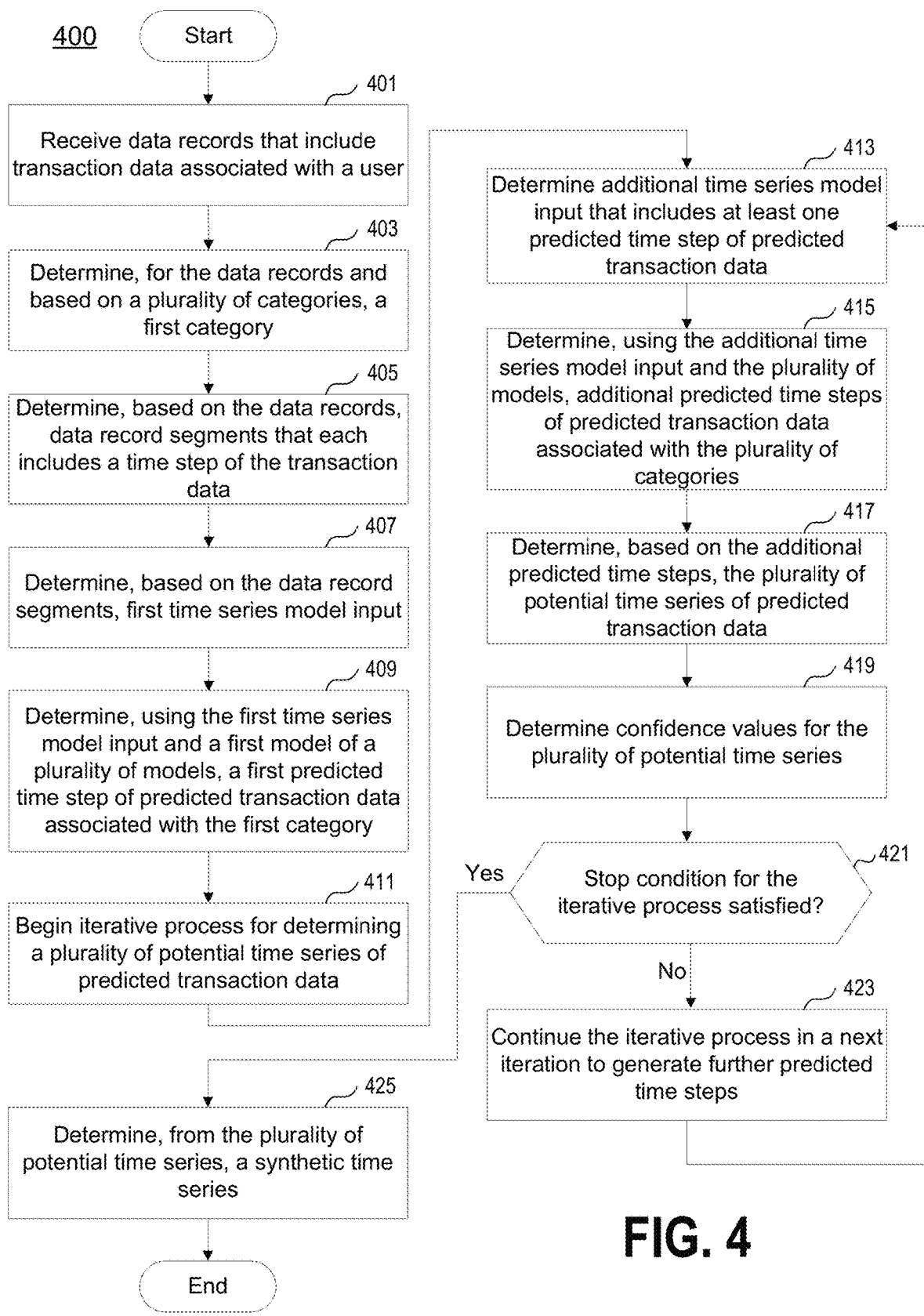
FIG. 4 depicts an example method for determining synthetic time series data based on plural machine learning models in accordance with various aspects described herein.

Having discussed the example computing environment 100 of FIG. 1, example methods of FIGS. 3, 4, and 5A-5D will be discussed. FIG. 3 depicts an example method for configuring plural machine learning models. FIG. 4 depicts an example method for determining synthetic time series data based on plural machine learning models. FIGS. 5A-5D depict example methods for using synthetic time series data. The example methods of FIGS. 3, 4, and 5A-5D may be performed by one or more devices of the example computing environment 100 of FIG. 1. For example, the example methods of FIGS. 3, 5, and 5A-5D may be performed by the server 110 of FIG. 1, or similar device(s). For simplicity, each of the example methods of FIGS. 3, 4, and 5A-5D will be discussed in terms of being performed by one or more computing devices.

FIG. 3 depicts an example method 300 for configuring plural machine learning models. Method 300 may be implemented in suitable computer-executable instructions and performed by one or more computing devices.

At step 301 of FIG. 3, one or more computing devices may receive configuration information for a plurality of models. The plurality of models may be the same as, or similar to the plurality of machine learning models 115 depicted in FIG. 1. The configuration information may include information necessary for configuring the plurality of models. For example, the configuration information may include an indication of how many models will be configured for, or otherwise included by, the plurality of models (e.g., three models, five models, etc.). The configuration information may include a definition for each of the plurality of models (e.g., network size, input size, output size, etc.). The configuration information may include an indication of a categorization scheme associated with the plurality of models (e.g., a categorization scheme with three categories) and/or an indication of which categories are included by the categorization scheme (e.g., a first category indicating low income, a second category indicating medium income, a third category indicating high income). The configuration information may indicate where training data associated with the categorization scheme can be found (e.g., an address or other identifier to the training data). The configuration information may have been authored by an operator of an enterprise, or some other person responsible for configuring the plurality of models.

At step 303, the one or more computing devices may initialize the plurality of models based on the configuration information received at step 301. Initializing the plurality of models may include initializing each model, such as by initializing the neural network of each model (e.g., configuring the input layer of the neural network to input certain amounts of data; configuring the output layer of the neural network to output a time step prediction and/or a confidence value; initializing weights and/or biases of the neural network). Initializing the plurality of models may include configuring each model based on the categorization scheme (e.g., a first model may be configured to output predictions associated with first category, a second model may be configured to output predictions associated with the second category, a third category may be configured to output predictions associated with the third category). Initializing the plurality of models may include storing information associating the plurality of models with the categorization scheme (e.g., store indications to identify which models are associated with which categories of the categorization scheme).

At step 305, the one or more computing devices may receive, for the plurality of models, training data associated with a plurality of categories. The training data may include a set of training data for each of the plurality of categories (e.g., first training data for a first category, second training data for a second category, third training data for a third category). In some variations, the training data may include a first corpus of account statements for accounts of first users that exhibit low spending, a second corpus of account statements of accounts for second users that exhibit medium spending, and a third corpus of account statements for accounts of third users that exhibit high spending. The location(s) of the training data may be indicated by the configuration information received at step 301. In such variations, receiving the training data may be performed based on the one or more computing devices retrieving the training data based on the configuration information and/or as a response to the one or more computing devices sending a request for the training data based on the configuration data.

At step 307, the one or more computing devices may train, based on the training data, the plurality of models. The training may apply one or more suitable training techniques, including, for example, a back-propagation technique, an adaptive optimizer, and the like. The training may be performed based on the categorization scheme. For example, each model may be trained using only the training data that is for the model's category (e.g., the first model may be trained using the first training data for the first category, the second model may be trained using the second training data for the second category, the third model may be trained using the third training data for the third category).

The example method 300 includes only some example steps that may be performed for configuring the plurality of models. Some variations may perform additional and/or alternative steps. As an example, some variations may, after training the plurality of models, perform a model validation step that determines whether the models are accurate. This determination may be based on validation data that is similar to, but in addition to, the training data. If the validation determines that the models are accurate, the method may end. If the validation determines that the models are not accurate, the method may proceed with a re-training process for all models or any model that was not accurate.

FIG. 4 depicts an example method 400 for determining synthetic time series data based on plural machine learning models. Method 400 may be implemented in suitable computer-executable instructions and performed by one or more computing devices. The plural machine learning models may have been previously configured using the method 300 of FIG. 3 or any other method suitable for configuring plural machine learning models.

At step 401 of FIG. 4, one or more computing devices may receive one or more data records that include transaction data associated with at least one user. The one or more data records may be the same as, or similar to, the one or more data records 103 of FIG. 1. The one or more data records may include various types of data including numeric data, textual data, and the like. The one or more data records may be a particular type of record such as customer record data, account statements, account information, or some other type of data that would include transaction data. As some examples, the one or more data records may include transaction data for a savings account of a user (e.g., indications of withdrawals and/or deposits into the savings account), for a checking account of a user (e.g., indications of withdrawals and/or deposits into the checking account), and/or for a credit card account of a user (e.g., indications of charges and/or payments to the credit card account).

At step 403, the one or more computing devices may determine, for the one or more data records and based on a plurality of categories, a first category. This determination may be performed to categorize the one or more data records. This determination may be the same as or similar to the categorization described in connection with FIG. 1 (e.g., determining the category 107 of FIG. 1). The plurality of categories may be associated with a categorization scheme. The plurality of categories and the categorization scheme may be the same as, or similar to, those discussed in FIGS. 1-3. As one example, if the categorization scheme provides three categories for different levels of spending, the plurality of categories may include a first category that indicates low spending, a second category that indicates medium spending, and a third category that indicates high spending.

At step 405, the one or more computing devices may determine, based on the one or more data records, data record segments. Each of the data record segments may include a time step of the transaction data. This determination may be performed to segment the one or more data records. This determination may be the same as or similar to the segmentation described in connection with FIG. 1 (e.g., determining the data record segments 105 of FIG. 1). As some examples, the determination of the data record segments may be based on a segmentation technique that organizes, transforms, or otherwise collects the transaction data of the one or more data records into segments. The segments may be organized as a time series and/or based on a particular time interval. The time interval may be based on a day, month, year, or some other discrete interval of time.

At step 407, the one or more computing devices may determine, based on the data record segments, first time series model input. This determination may depend on the configuration of the plurality of models and/or the time interval used to form a time series of the data record segments. For example, in some variations, each of the plurality of models may be configured to receive a single time step (e.g., receive the most recent time step, t). In such variations, the one or more computing devices may determine first time series model input that includes a single time step of the data record segments (e.g., the time step t of the data record segments). In other variations, each of the plurality of models may be configured to receive, as input, plural time steps (e.g., receive the two most recent time steps, t and t−1). In such variations, the one or more computing devices may determine first time series model input that includes plural time steps of the data record segments (e.g., the time steps t and t−1 of the data record segments).

At step 409, the one or more computing devices may determine, using the first time series model input and a first model of the plurality of models, a first predicted time step of predicted transaction data. This determination may include sending the first time series model input to the first model and receiving, as output from the first model, the first predicted time step. The first model may be sent the first time series model input based on the first category, which was determined at step 403. In other words, the one or more computing devices may send the first model input to a model that matches, or is otherwise configured for, the first category. The first predicted time step may be a prediction of the next time step in the time series of the data record segments. In this way, the predicted time step may include predicted transaction data for the next time step in the time series of the data records segments. For example, if the time interval is a month, the first predicted time step may include predicted transaction data that indicates transactions that are predicted to occur in the next month in the time series of the data record segments 105. This determination may be performed the same as, or similar to, the manner in which the predicted time step 120 is determined in connection with FIG. 1 and/or the predicted time step 220 of FIG. 2. Additionally, as part of this step or in connection with this step, the first model may output a confidence value for the first predicted time step. The confidence value may be stored for later use.

At step 411, the one or more computing devices may begin an iterative process for determining a plurality of potential time series of predicted transaction data. The iterative process may be the same as, or similar to the iterative process described in connection with FIGS. 1 and 2. As some examples and as will be described in connection with steps 413-425 of FIG. 4, the iterative process may include using the first predicted time step as input into each of the plurality of models, using the plurality of models to determine further predicted time steps, determining whether to continue or end the iterative process based on a stop condition, using the further predicted time steps as input into each of the plurality of models to determine yet further predicted time steps if the iterative process continues, and proceeding to determine a synthetic time series if the iterative process ends.

Steps 413-421 represent example steps of an iteration of the iterative process. Steps 413-421 may be performed for each iteration of the iterative process. Put another way, steps 413-421 may be repeatedly performed during the iterative process until the step condition at step 421 is satisfied and the iterative process ends. As one example, step 413 may be repeatedly performed such that second time series model input is determined for a first iteration, third time series model input is determined for a second iteration, fourth time series model input is determined for a third iteration, after which the stop condition is satisfied and the iterative process ends. As another example, step 415 may be repeatedly performed so that each of the plurality of models is used at each iteration. Steps 413-417 represent examples steps of an iteration that may be performed to determine additional, or further, predicted time steps. Steps 419-421 represent example steps of an iteration that may be performed to determine whether to continue or end the iterative process. Steps 419-421 are based on an example stop condition associated with confidence values of the predicted time steps. Based on the steps 413-421, a synthetic time series may be determined, at step 425, that is based on the example iterative process of steps 413-421, the confidence values of the example iterative process, and the plurality of potential time series of the example iterative process.

At step 413, the one or more computing devices may determine additional time series model input that includes at least one predicted time step of predicted transaction data. This determination may be based on the most recent predicted time steps and/or the current iteration of the iterative process. For example, if the iterative process is at the first iteration, the additional time series model input may include the first predicted time step determined at step 409. If the iterative process is at the second iteration, the additional time series model input may include a predicted time step determined during the first iteration. In general, if the iterative process is at the second iteration or a later iteration, the additional time series model input may include at least one predicted time step that was determined during the previous iteration of the iterative process. This determination may be based on the configuration of the plurality of models and/or the time interval used to form a time series of the data record segments. For example, in some variations, each of the plurality of models may be configured to receive a single time step (e.g., receive the most recent time step, t). In such variations, the one or more computing devices may determine additional time series model input that includes a single time step of predicted transaction data (e.g., the time step t+1 of the first predicted time step). In other variations, each of the plurality of models may be configured to receive, as input, plural time steps (e.g., receive the two most recent time steps, t+1 and t+2). In such variations, the one or more computing devices may determine additional time series model input that includes plural time steps of predicted transaction data (e.g., the time steps t+1 and t+2, as included by the first predicted time step and a further predicted time step of a previous iteration of the iterative process). This determination may be performed the same as, or similar to, the manner in which iterations of the iterative process, described in connection with FIG. 1 and/or FIG. 2, determine model input for determining further predicted time steps.

At step 415, the one or more computing devices may determine, using the additional time series model input and the plurality of models, additional predicted time steps of predicted transaction data. This determination may include sending the additional time series model input to each model of the plurality of models. Accordingly, this determination may include receiving, as output from each model of the plurality of models, an additional predicted time step. In this way, additional predicted time steps are received from the plurality of models. In variations where each of the plurality of models is configured for, or otherwise associated with, a particular category, the additional predicted time steps may be associated with the plurality of categories discussed at step 403.

Each additional predicted time step may be a prediction of an additional step in the time series of the data record segments. In this way, each additional predicted time step may include predicted transaction data for an additional time step in the time series of the data records segments. This determination may be performed the same as, or similar to, the manner in which iterations of the iterative process, described in connection with FIG. 1 and/or FIG. 2, determine additional, or further, predicted time steps. Additionally, as part of this step or in connection with this step, each model of the plurality of models may output a confidence value for its additional predicted time step. The confidence values received from the plurality of models may be stored for later use.

At step 417, the one or more computing devices may determine, based on the additional predicted time steps, the plurality of potential time series of predicted transaction data. This determination may include adding the additional predicted time steps to one or more data structures that includes the plurality of potential time series, or otherwise modifying the one or more data structures based on the additional predicted time steps. This determination may be performed the same as, or similar to, the manner in which iterations of the iterative process, described in connection with FIG. 1 and/or FIG. 2, determine potential time series. For example, the plurality of potential time series determined at this step may be the same, or similar to, the plurality of potential time series 225 of FIG. 2 after a first iteration of the iterative process. As another example, the plurality of potential time series determined at this step may be the same, or similar to, the plurality of potential time series 230 of FIG. 2 after a second iteration of the iterative process.

At step 419, the one or more computing devices may determine confidence values for the plurality of potential time series. As discussed in connection with steps 409 and 415, confidence values output by the models (e.g., a confidence value for the first predicted time step and confidence values for the additional predicted time steps) may be stored for later use. This determination may be performed based on the confidence values stored at steps 409 and 415, and based on the potential time series of step 417. For example, the one or more computing devices may determine, based on the confidence values stored at steps 409 and 415, an overall confidence value for each of the plurality of potential time series. An overall confidence value for a particular potential time series may be determined by identifying the confidence values for each predicted time step of a particular potential time series and multiplying those confidence values together.

At step 421, the one or more computing devices may determine whether a stop condition for the iterative process is satisfied. This determination may be performed based on the confidence values of step 419. For example, the stop condition may be configured to end the iterative process when confidence in the potential time series has fallen below a threshold. In some variations, to determine whether such a stop condition is satisfied, the one or more computing devices may compare the overall confidence values for the potential time series to the threshold. If each of the overall confidence values is greater than the threshold, the stop condition may not be satisfied and the iterative process may continue and the method may proceed to step 423. If any of the overall confidence values is less than or equal to the threshold, the stop condition may be satisfied and the iterative process may end and the method may proceed to step 425. In other variations, to determine whether such a stop condition is satisfied, the one or more computing devices may compare the overall confidence values for the potential time series to the threshold but continue or end the iterative process in alternative ways. For example, the stop condition may be satisfied if none of the potential time series or at most one potential time series is greater than the threshold. If the stop condition is satisfied At step 423, based on determining that the stop condition is not satisfied, the one or more computing devices may continue the iterative process. Continuing the iterative process may include repeating steps 413-421 in a next iteration to generate further predicted time steps.

At step 425, based on determining that the stop condition is satisfied, the one or more computing devices may determine a synthetic time series from the plurality of potential time series. This determination may be performed the same as, or similar to, the manner in which the synthetic time series 130 of FIG. 1 is determined. In some variations, this determination may be based on confidence values associated with the plurality of potential time series. For example, the one or more computing devices may compare the overall confidence values of the plurality of potential time series to each other; determine, based on the comparison, which potential time series indicates the greatest confidence; and select the potential time series with the greatest confidence as the synthetic time series. In additional or alternative variations, determining the synthetic time series may be based on selecting one of the plurality of potential time series in a randomized fashion; selecting multiple, or all, of the plurality of potential time series as the synthetic time series; and/or a combination of any of the above-discussed ways in which the synthetic time series can be determined from the plurality of potential time series.

FIGS. 5A-5D depict example methods 501, 511, 521, 531 for using synthetic time series data. Methods 501, 511, 521, 531 may be implemented in suitable computer-executable instructions and performed by one or more computing devices. The synthetic time series may have been previous determined by performing example method 400 or any other method suitable for determining synthetic time series data.

Beginning with the example method 501 of FIG. 5A, at step 503, the one or more computing devices may store the synthetic time series in a database of training data. The database may be the same as, or similar to, the database 150 of FIG. 1. By storing the synthetic time series in the database, the synthetic time series may be made available for training another machine learning model.

At step 505, the one or more computing devices may receive, based on a training process for a model, a request for training data. The request may be a generalized request for a corpus of training data or may be a specific request that identifies the synthetic time series. The request may be from a requesting device that will perform the training process.

At step 507, the one or more computing devices may send, as a response to the request, the synthetic time series. The synthetic time series may be sent to the requesting device to allow the requesting device to perform the training process using the synthetic time series.

The example method 501 of FIG. 5A provides an example use of a synthetic time series that includes a machine learning task. In particular, the example method 501 provides an example that includes a training task. Synthetic time series could be used as part of other types of machine learning tasks, such as a validation technique that validates another machine learning model using the synthetic time series.

Continuing with the example method 511 of FIG. 5B, at step 513, one or more computing devices may determine, based on the synthetic time series, one or more service offers for a user. The one or more service offers may include an offer for a bank account, an offer for a credit card, an offer for a discount, or other type of service, that the user 140 may want to take advantage of. For example, the one or more service offers may include an invitation to open a savings account, a checking account, or a credit card account. The one or more service offers may include an advertisement for a discount to an online merchant. In some variations, the one or more service offers may be based on predicted behavior of the user. The predicted behavior of the user may be indicated by the synthetic time series. Indeed, in some variations, the synthetic time series indicates predicted behavior of the user in view of the synthetic time series including predicted time steps that were determined based on actual transactions associated with the user (e.g., predicted time steps determined based on actual transactions included on account statements of the user).

At step 515, the one or more computing devices may send an indication of the one or more service offers to the user. The indication may be sent to a device associated with the user (e.g., user computing device 135 of FIG. 1). The indication of the one or more service offers may be included as part of an email, text message, chat message, web page, or the like.

Figures 5C, 5D:
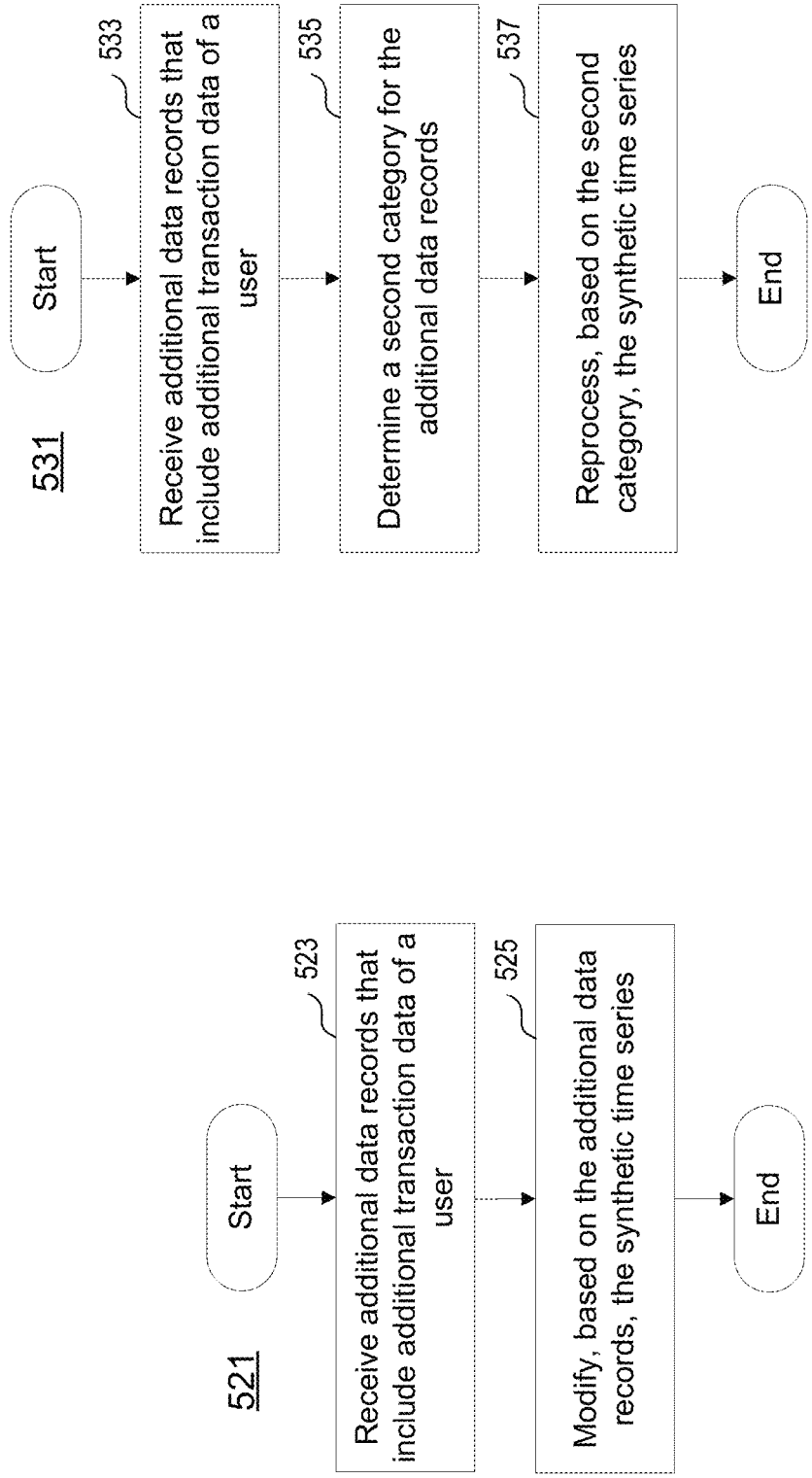

Continuing with the example method 521 of FIG. 5C, at step 523, one or more computing devices may receive one or more additional data records that include additional transaction data of a user. The additional transaction data may include, for example, a new account statement for an account of the user.

At step 525, the one or more computing devices may, based on the additional transaction data, modify the synthetic time series. For example, the synthetic time series may be modified by replacing the predicted time step that corresponds, in time, with the additional transaction data (e.g., replace the predicted time step, t+1, with the additional transaction data if the additional transaction data is also for t+1). This modified synthetic time series could be used the same as, or similar to, the synthetic time series of the example methods 501 and 511 of FIGS. 5A and 5B.

Continuing with the example method 531 of FIG. 5D, at step 533, the one or more computing devices may receive one or more additional data records that include additional transaction data of a user. The additional transaction data may include, for example, a new account statement for an account of the user.

At step 535, the one or more computing devices may determine a second category for the one or more additional data records. This may be performed the same as, or similar to, the categorization described in connection with FIG. 1 (e.g., category 107 of FIG. 1) and/or step 403 of FIG. 4 (e.g., the first category).

At step 537, the one or more computing devices may, based on the second category, reprocess the synthetic time series. For example, the second category may be compared to the first category that initially formed the basis for determining the synthetic time series (e.g., the first category as determined at step 403 of FIG. 4). If the second category and the first category do not match, the synthetic time series may be deleted from any repository or database to which it is stored (e.g., deleted form database 150 of FIG. 1); the synthetic time series may be associated with a flag indicating predictions of the synthetic time series do not match the additional transaction data; and/or the synthetic time series may be sent for further analysis by an operator. Additionally, if the second category and the first category do not match, a process to determine a new synthetic time series based on the additional transaction data may be performed (e.g., the example method 400 of FIG. 4 may be performed using the one or more additional data records as the one or more data records of step 401). If the second category and the first category match, the synthetic time series may be associated with a flag indicating predictions of the synthetic time series match the additional transaction data, or otherwise nothing may happen.

As another example, the additional transaction data may be sent, as input, to a model matching, or otherwise configured for, the second category (e.g., the second model 115-2 of FIG. 1). As a result, a second predicted time step may be determined (e.g., based on the output of the model 115-2 of FIG. 1). The synthetic time series may be modified by replacing the predicted time step of the synthetic time series that corresponds, in time, with the second predicted time step (e.g., replace the predicted time step, t+1, with the second predicted time step if the second predicted time step is also for t+1). This modified synthetic time series could be used the same as, or similar to, the synthetic time series of the example methods 501 and 511 of FIGS. 5A and 5B.

In view of FIGS. 1-4 and 5A-5D, methods, systems, and apparatuses for generating synthetic time series data based on time series predictions and plural machine learning models have been have been discussed.

Figure 6:
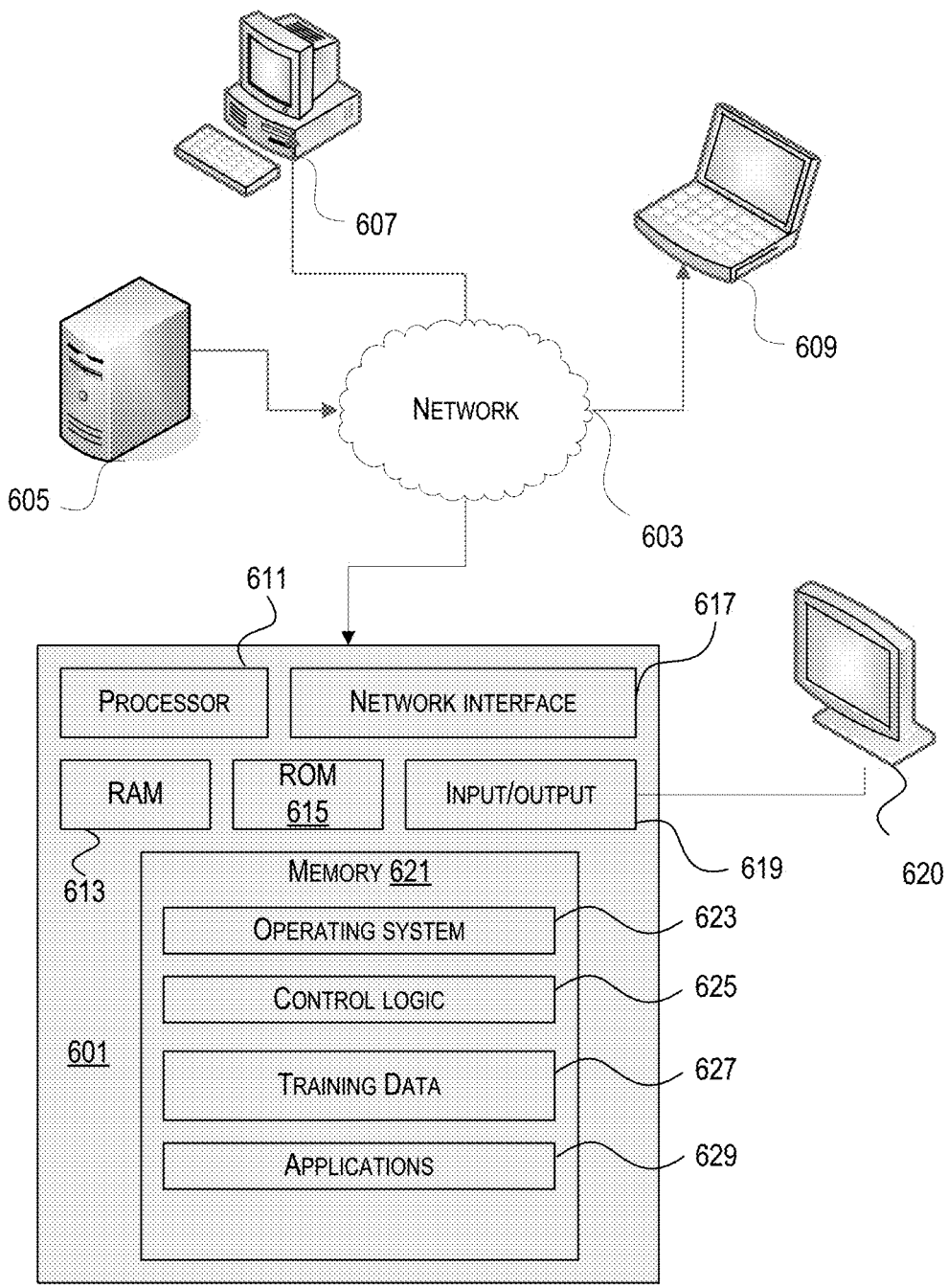
FIG. 6 depicts an example of a computing device that may be used in implementing one or more aspects described herein.

FIG. 6 illustrates one example of a computing device 601 that may be used to implement one or more illustrative aspects discussed herein. For example, the computing device 601 may implement one or more aspects of the disclosure by reading and/or executing instructions and performing one or more actions based on the instructions. The computing device 601 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

The computing device 601 may operate in a standalone environment or a networked environment. As shown in FIG. 6, various network nodes 601, 605, 607, and 609 may be interconnected via a network 603, such as the Internet. Other networks may also or alternatively be used, including private intranets, corporate networks, LANs, wireless networks, personal networks (PAN), and the like. Network 603 is for illustration purposes and may be replaced with fewer or additional computer networks. A local area network (LAN) may have one or more of any known LAN topology and may use one or more of a variety of different protocols, such as Ethernet. Devices 601, 605, 607, 609 and other devices (not shown) may be connected to one or more of the networks via twisted pair wires, coaxial cable, fiber optics, radio waves or other communication media.

As seen in FIG. 6, the computing device 601 may include a processor 611, RAM 613, ROM 615, network interface 617, input/output interfaces 619 (e.g., keyboard, mouse, display, printer, etc.), and memory 621. Processor 611 may include one or more computer processing units (CPUs), graphical processing units (GPUs), and/or other processing units such as a processor adapted to perform computations associated with speech processing or other forms of machine learning. I/O 619 may include a variety of interface units and drives for reading, writing, displaying, and/or printing data or files. I/O 619 may be coupled with a display such as display 620. Memory 621 may store software for configuring computing device 601 into a special purpose computing device in order to perform one or more of the various functions discussed herein. Memory 621 may store operating system software 623 for controlling overall operation of the computing device 601, control logic 625 for instructing computing device 601 to perform aspects discussed herein, training data 627, and other applications 629. The computing device 601 may include two or more of any and/or all of these components (e.g., two or more processors, two or more memories, etc.) and/or other components and/or subsystems not illustrated here.

Devices 605, 607, 609 may have similar or different architecture as described with respect to computing device 601. Those of skill in the art will appreciate that the functionality of computing device 601 (or device 605, 607, 609) as described herein may be spread across multiple data processing devices, for example, to distribute processing load across multiple computers, to segregate transactions based on geographic location, user access level, quality of service (QoS), etc. For example, devices 601, 605, 607, 609, and others may operate in concert to provide parallel computing features in support of the operation of control logic 625.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Although the subject matter has been described in language specific to structural features and/or methodological acts, it is to be understood that the subject matter defined in any claim is not necessarily limited to the specific features or acts described above. Rather, the specific features and acts described above are disclosed as example forms of implementing any claim or any of the appended claims.

We claim:

1. A method comprising:
   determining, by the one or more computing devices, a first category for one or more data records, wherein the first category is of a plurality of categories, wherein the one or more data records include transaction data of a user;
   determining, by the one or more computing devices and based on the one or more data records, data record segments, wherein each segment of the data record segments includes a time step of the transaction data;
   based on the data record segments, determining, by the one or more computing devices and using a first model, a first predicted time step of predicted transaction data, wherein the first predicted time step is associated with the first category, wherein the first model is configured to predict first time steps associated with the first category, and wherein the first model is one of a plurality of machine learning models configured to predict time steps associated with the plurality of categories;
   based on the first predicted time step, determining, by the one or more computing devices and using the plurality of machine learning models, second predicted time steps of predicted transaction data, wherein the second predicted time steps are associated with the plurality of categories;
   based on the first predicted time step and the second predicted time steps, determining, by the one or more computing devices, a plurality of potential time series of predicted transaction data; and
   based on the plurality of potential time series, determining, by the one or more computing devices, a synthetic time series for the user, wherein the synthetic time series includes the first predicted time step and one of the second predicted time steps.

2. The method of claim 1, further comprising:
   based on confidence values for the plurality of potential time series, determining, by the one or more computing devices, that a stop condition is not satisfied;
   based on determining that the stop condition is not satisfied, continuing to determine further predicted time steps until the stop condition is satisfied.

3. The method of claim 2, wherein continuing to determine further predicted time steps until the stop condition is satisfied includes:
   based on at least one of the second predicted time steps, determining, by the one or more computing devices and using the plurality of machine learning models, third predicted time steps of predicted transaction data, wherein the third predicted time steps are associated with the plurality of categories.

4. The method of claim 2, wherein continuing to determine further predicted time steps until the stop condition is satisfied includes:
   determining, by the one or more computing devices, that the stop condition is satisfied; and
   proceeding to determine the synthetic time series based on the stop condition being satisfied.

5. The method of claim 1, further comprising:
   receiving, by the one or more computing devices, one or more additional data records that include additional transaction data of the user;
   modifying, based on the one or more additional data records, the synthetic time series.

6. The method of claim 1, further comprising:
   receiving, by the one or more computing devices, one or more additional data records that include additional transaction data of the user;
   based on applying one or more classification techniques to the one or more additional data records, determining, by the one or more computing devices, a second category for the one or more additional data records, wherein the second category is of the plurality of categories; and
   reprocessing, based on the second category, the synthetic time series.

7. The method of claim 1, further comprising:
   based on the synthetic time series, determining one or more service offers for the user; and
   sending, to a device associated with the user, an indication of the one or more service offers.

8. The method of claim 1, further comprising:
   based on the synthetic time series, training an additional model.

9. The method of claim 1, wherein the transaction data includes one or more account statements for an account of the user;
   wherein the plurality of categories indicates income levels; and
   wherein the method further comprises:
   training the plurality of machine learning models based on training data for the income levels, wherein training the plurality of machine learning models includes training the first model based on first training data for a first income level.

10. The method of claim 9, wherein each of the plurality of machine learning models includes a recurrent neural network.

11. An apparatus comprising:
    one or more processors; and
    memory storing executable instructions that, when executed by the one or more processors, cause the apparatus to:
    determine a first category for one or more data records, wherein the first category is of a plurality of categories, wherein the one or more data records include transaction data of a user;
    determine, based on the one or more data records, data record segments, wherein each segment of the data record segments includes a time step of the transaction data;
    based on the data record segments, determine, using a first model, a first predicted time step of predicted transaction data, wherein the first predicted time step is associated with the first category, wherein the first model is configured to predict first time steps associated with the first category, and wherein the first model is one of a plurality of machine learning models configured to predict time steps associated with the plurality of categories;
    based on the first predicted time step, determine, using the plurality of machine learning models, second predicted time steps of predicted transaction data, wherein the second predicted time steps are associated with the plurality of categories;
    determine, based on the first predicted time step and the second predicted time steps, a plurality of potential time series of predicted transaction data; and
    based on the plurality of potential time series, determine a synthetic time series for the user, wherein the synthetic time series includes the first predicted time step and one of the second predicted time steps.

12. The apparatus of claim 11, wherein the executable instructions, when executed by the one or more processors, cause the apparatus to:
based on confidence values for the plurality of potential time series, determine that a stop condition is not satisfied;
based on determining that the stop condition is not satisfied, continue determining further predicted time steps until the stop condition is satisfied.

13. The apparatus of claim 12, wherein the executable instructions, when executed by the one or more processors, cause the apparatus to continue determining further predicted time steps until the stop condition is satisfied by at least:
based on at least one of the second predicted time steps, determining, using the plurality of machine learning models, third predicted time steps of predicted transaction data, wherein the third predicted time steps are associated with the plurality of categories.

14. The apparatus of claim 12, wherein the executable instructions, when executed by the one or more processors, cause the apparatus to continue determining further predicted time steps until the stop condition is satisfied by at least:
determining that the stop condition is satisfied; and
proceeding to determine the synthetic time series based on the stop condition being satisfied.

15. The apparatus of claim 11, wherein the executable instructions, when executed by the one or more processors, cause the apparatus to:
receive one or more additional data records that include additional transaction data of the user;
based on applying one or more classification techniques to the one or more additional data records, determine a second category for the one or more additional data records, wherein the second category is of the plurality of categories; and
reprocess, based on the second category, the synthetic time series.

16. One or more non-transitory computer-readable media storing executable instructions that, when executed, cause one or more computing devices to:
determine a first category for one or more data records, wherein the first category is of a plurality of categories, wherein the one or more data records include transaction data of a user;
determine, based on the one or more data records, data record segments;
based on the data record segments, determine, using a first model, a first predicted time step of predicted transaction data, wherein the first model is configured to predict first time steps associated with the first category, and wherein the first model is one of a plurality of machine learning models configured to predict time steps associated with the plurality of categories;
based on the first predicted time step, determine, using the plurality of machine learning models, second predicted time steps of predicted transaction data;
determine, based on the first predicted time step and the second predicted time steps, a plurality of potential time series of predicted transaction data;
based on the plurality of potential time series, determine a synthetic time series for the user, wherein the synthetic time series includes the first predicted time step and one of the second predicted time steps.

17. The one or more non-transitory computer-readable media of claim 16, wherein the executable instructions, when executed, cause the one or more computing devices to:
based on confidence values for the plurality of potential time series, determine that a stop condition is not satisfied;
based on determining that the stop condition is not satisfied, continue determining further predicted time steps until the stop condition is satisfied.

18. The one or more non-transitory computer-readable media of claim 17, wherein the executable instructions, when executed, cause the one or more computing devices to continue determining further predicted time steps until the stop condition is satisfied by at least:
based on at least one of the second predicted time steps, determining, using the plurality of machine learning models, third predicted time steps of predicted transaction data, wherein the third predicted time steps are associated with the plurality of categories.

19. The one or more non-transitory computer-readable media of claim 17, wherein the executable instructions, when executed, cause the one or more computing devices to continue determining further predicted time steps until the stop condition is satisfied by at least:
determining that the stop condition is satisfied; and
proceeding to determine the synthetic time series based on the stop condition being satisfied.

20. The one or more non-transitory computer-readable media of claim 16, wherein the executable instructions, when executed, cause the one or more computing devices to:
receive one or more additional data records that include additional transaction data of the user;
based on applying one or more classification techniques to the one or more additional data records, determine a second category for the one or more additional data records, wherein the second category is of the plurality of categories; and
reprocess, based on the second category, the synthetic time series.

* * * * *